(12) United States Patent
Kobata

(10) Patent No.: US 6,631,405 B1
(45) Date of Patent: *Oct. 7, 2003

(54) SMART INTERNET INFORMATION DELIVERY SYSTEM WHICH AUTOMATICALLY DETECTS AND SCHEDULES DATA TRANSMISSION BASED ON STATUS OF CLIENT'S CPU

(75) Inventor: Hiroshi Kobata, Newton, MA (US)

(73) Assignee: Atabok, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/170,431

(22) Filed: Oct. 13, 1998

Related U.S. Application Data

(63) Continuation of application No. PCT/US97/21520, filed on Nov. 21, 1997, and a continuation of application No. 08/755,029, filed on Nov. 22, 1996, now Pat. No. 5,845,074.

(51) Int. Cl.[7] .............................................. G06F 15/16
(52) U.S. Cl. ........................ 709/219; 709/232; 709/237; 345/772
(58) Field of Search ................................ 709/217, 219, 709/232, 233, 234, 237; 345/700, 708, 736, 772

(56) References Cited

U.S. PATENT DOCUMENTS

| | | | |
|---|---|---|---|
| 3,623,007 A | 11/1971 | Eckhart et al. | 395/557 |
| 4,126,895 A | 11/1978 | Weemaes et al. | 395/675 |
| 4,630,196 A | 12/1986 | Bednar, Jr. et al. | 395/200.32 |
| 5,020,020 A | 5/1991 | Pomfret et al. | 395/200.65 |
| 5,077,763 A | 12/1991 | Gagnoud et al. | 377/16 |
| 5,265,205 A | 11/1993 | Schroder | 395/200.47 |
| 5,301,348 A * | 4/1994 | Jaaskelainen | 345/348 |
| 5,491,820 A | 2/1996 | Belove et al. | 707/3 |
| 5,557,724 A | 9/1996 | Sampat et al. | 345/327 |
| 5,684,918 A | 11/1997 | Abecassis | 386/83 |
| 5,913,040 A | 6/1999 | Rakavy et al. | 395/200.62 |

OTHER PUBLICATIONS

"Offline Services" Computer Letter, Sep. 30, 1996 v12 n32 p1(4). Online. CD. Computer Select 1996.

Haskin, David. "Taming the Net" Computer Shopper, Dec. 1996 v16 n12 p. 576. Online, CD Computer Select 1996.

Kwan et al., "An Intelligent Agent for Multimedia Newspaper" Electrical and Computer Engineering, 1995 Canadian Conf. Online. CD. IEEE/IEE Publications Ondisc.

PCT Search Report dated Mar. 13, 1998.

* cited by examiner

Primary Examiner—Dung C. Dinh
(74) Attorney, Agent, or Firm—Fish & Richardson P.C.

(57) ABSTRACT

A smart delivery system is provided for transmitting video, audio, hyper-text and web documents to end users via the internet over telephone lines, fiber optics, satellite links, or other direct communications on a non-realtime discontinuous basis in which the server providing the information periodically ascertains whether the end user terminal is busy. If so, the transmission to the end user is terminated and the information is stored until such time as the "busy" indication is terminated. In one embodiment, the indication for the end user of incoming information is in the form of an icon generated on-screen on which the user can click to obtain the sought-after information.

18 Claims, 5 Drawing Sheets

SMART INTERNET INFORMATION DELIVERY SYSTEM WHICH AUTOMATICALLY DETECTS AND SCHEDULES DATA TRANSMISSION BASED ON STATUS OF CLIENT'S CPU

This is a continuation of application Ser. No. 08/755,029, filed Nov. 22, 1996 now U.S. Pat. No. 5,845,074.

FIELD OF INVENTION

This invention relates to transmission of information over the internet or like network and more particularly to a system for providing end users with video, audio, hyper-text, and web content on a periodic basis based on the ability of the terminal at the end user to accept and display the information.

BACKGROUND OF THE INVENTION

Transmission technology exists which allows a content provider to send information including video, audio, hyper-text and web documents to end users over telephone lines, through fiber optics, through satellite transmissions or through other direct connections. Such content including documents, program material, advertising, etc. has, in the past, been provided on a realtime basis in which an end user is denied access to the information if an application is running on his/her corresponding terminal. Moreover, another impediment to realtime information transfer is network bandwidth which severely limits the ability to transmit realtime data. This is especially true of full-frame video, as well as JPEG pictures.

The above makes exceedingly difficult the task of providing advertising, motion pictures, or other information-dense data to subscribers who seek it. Even if the data were available, there is presently no system for accessing this data by the end user unless the user endlessly clicks through folders and windows, which requires the end users to execute many "pull" operations, such as opening a web browser, selecting a command, etc. in order to pull up the required information.

The problems with such transmission technology centers around the limited capacity or volume of the network to transmit information which can be practically delivered to end users due to the infrastructure surrounding the net, such as CPU speed and network throughput. The result is that for entities to provide information to individual users on a requested basis, the information is not as easily accessible as changing the channels on a television. The reason, unlike the television scenario in which the only constraint is the time of the program such as news, drama, etc., is that end users on the network must be made aware of the arrival and location of data to be able to access it. Moreover, this must be done on a system which is bandwidth-limited and overloaded with applications that are running at the end user's terminal.

Thus, the problem of providing realtime on-line access to information from a provider is that if an application is running on the user's terminal, it is difficult to hold the information coming from the server, much less to provide the user with notice of the arrival of information and it's contents at a glance.

Thus, the problem with a realtime system includes the difficulty of a subscriber expecting certain information to be able to have the information at his/her fingertips without getting out of the particular application running on his/her computer to await the arrival of the data.

Moreover, while indications of incoming data have been provided in the past, there was no way for the user to be able to select which data he/she wishes to access other than by a cumbersome process of accessing window after window until the sought-after information becomes available.

SUMMARY OF THE INVENTION

Rather than providing a realtime or continuous transmission of information to network users, in the subject invention the system ascertains whether or not the intended recipient's computer is busy or not. In one embodiment, the server periodically checks the "busyness" of the network and the end user's terminal prior to transmitting stored information to this user. Thereafter, the server immediately after ascertaining that the network subscriber is capable of receiving the messages, sends out the message to the particular network address.

At the same time, the subject invention provides a change in the methodology of transmitting information by indicating that the information which has been subscribed to is available through the utilization of an on-screen icon. What this means to the end user is that rather than having to click through numerous windows to obtain the information for which he/she has subscribed, in the subject invention all that is necessary is to click on the appropriate icon on the screen, at which time the information from the server which has been locally stored is opened and presented to the user, thereby providing an ease of access to the information heretofore not possible.

The subject invention therefore ensures to information providers that they will not have any bandwidth limitations imposed on them. Thus, there are theoretically no limitations related to information capacity or volume of the system in order to provide the information to the subscribers.

The information required can take as much time as a week to be provided to local storage, and can be provided at such times as the user's terminal is not busy. By sending information only when the user terminal is not busy, there is no limitation on the amount of information that can be provided and stored locally.

Information providers can therefore provide a service such as renting videos through the internet, selling CD music through the internet, and providing information which is recordable on CDs by recording and playback devices at the user's terminal. Moreover, information providers can sell daily news as an electronic package and can provide audio/video/document advertising or catalogs to be delivered at off peak hours when applications are not running on the subscriber's computers.

End users can easily identify the arrival of information and data and watch it by simply double-clicking the icon provided on the screen. The subject system therefore provides exceptionally easy operation for the accessing of subscribed-for information which increases the number of users and provides TV-like entertainment on demand through the subject non-realtime process.

In summary, advertisement and program material can be announced through the utilization of on-screen icons which are always presented on-screen and not in folders. The smart delivery technology is non-realtime so as to be able to locally store only those ads or program material the subscriber wants to see, followed by the delivery of the material with full frame video and audio. As will be appreciated, the information provider can provide an icon along with information to permit direct access by the user.

In one embodiment, a specialized algorithm is provided for ascertaining whether or not the user's CPU is busy. The system is divided between the client side and the server side, with the client side maintaining a count representing the time that the CPU is occupied by applications running at the client side. This is done over a period such as five seconds to generate a number reflecting "user state", plus Kernel state, plus Context switches, thus to derive a value in terms of x mscc/5 sec. This value is compared with criteria indicating if the CPU is too busy. If so, a signal is provided over the net to stop transmitting data, with a hold signal being provided to the server side to interrupt any information being provided to the particular user.

The subject system also keeps track of the network occupation during the same preceding five seconds, with network occupation being a function of the data transmitted in terms of kilobytes for the last five seconds. This second number is compared with a second criteria utilized to indicate full occupation of the network. If the network occupation is above a predetermined level, a hold signal is sent from the client side to the server side. If the second number is less than that indicating full occupation, file transfer is slowed or stopped so as to not interfere with other running applications or data transfers.

In summary, if interference is sensed, then the second hold signal is provided to the server side to wait for a send mode signal which is generated from the client side and transmitted to the server side to send the remaining data. Thereafter, an end-of-data signal is transmitted from the server side to the client side. After receipt of the end-of-data signal, the client side transmits a "data transfer complete" signal to the server side indicating that the icon for the transmitted information exists on-screen at the client screen. Thus, at the point that the on-screen icon exists at the client side there is an indication sent to the server side of the receipt of data at the client side and that the information is stored locally at the client side.

Put another way, the server links the network to the screen of the user's terminal and places the icon on the screen indicating to the user that the message has been delivered and is locally stored, simultaneously indicating the existence of a message. The icon can be placed on the screen even after being held, for instance, until a specific day such as a birthday.

BRIEF DESCRIPTIONS OF THE DRAWINGS

These and other features of the subject invention will be better understood taken in conjunction with the Detailed Description in conjunction with the Drawings of which;

Figure 3:
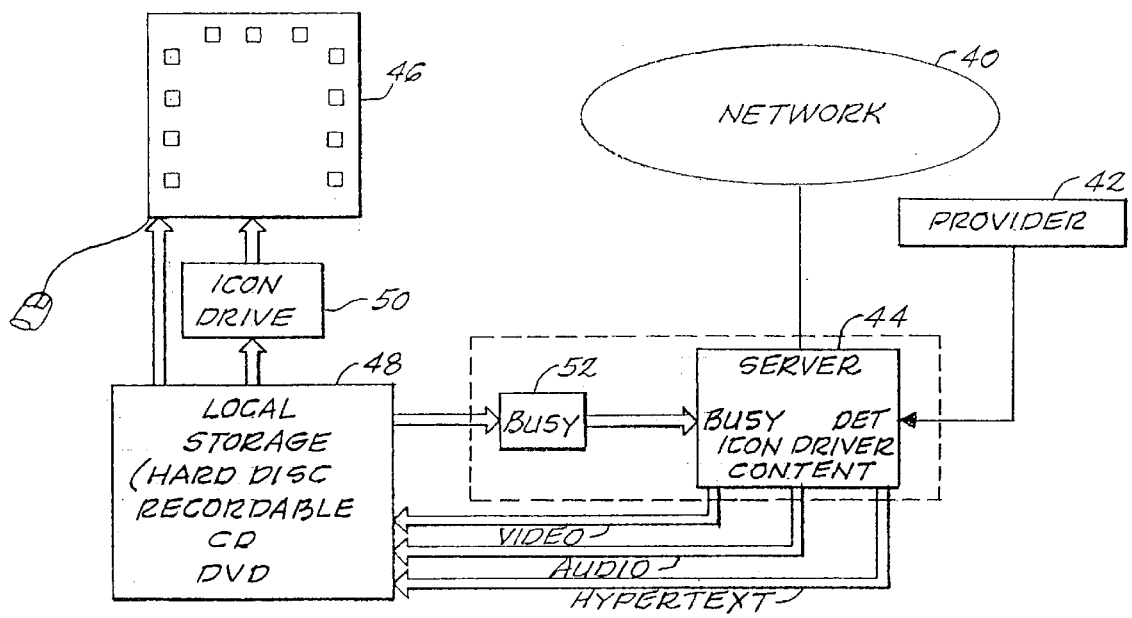
FIG. 3 is a more detailed block diagram of the system of FIG. 1 indicating the client side and the server side, with a system for establishing network and terminal busy.
Figure 4:
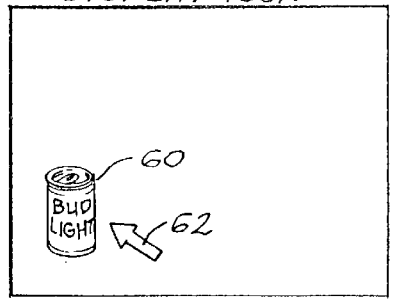
FIG. 4 is a diagrammatic illustration of the screen of FIG. 3 in which an icon such as that associated with advertising is presented in the lower left corner of the screen.
Figure 5:
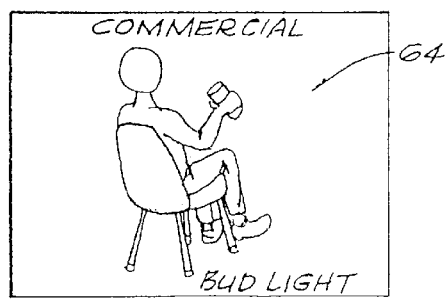
FIG. 5 is a screen shot of a commercial running on the screen of the terminal FIG. 3 after having been selected through clicking on the icon of FIG. 4.
Figure 6:
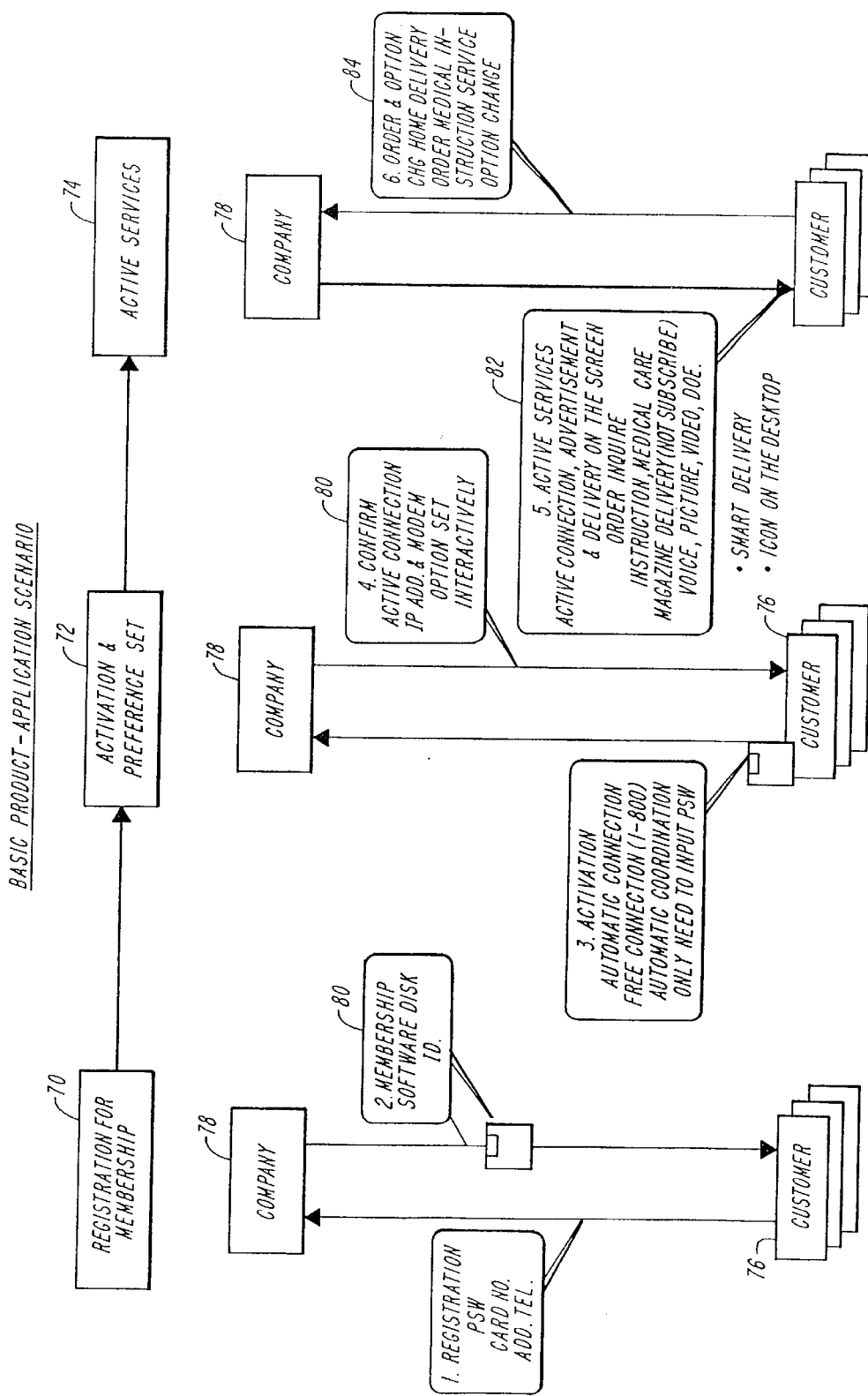
Figure 7:
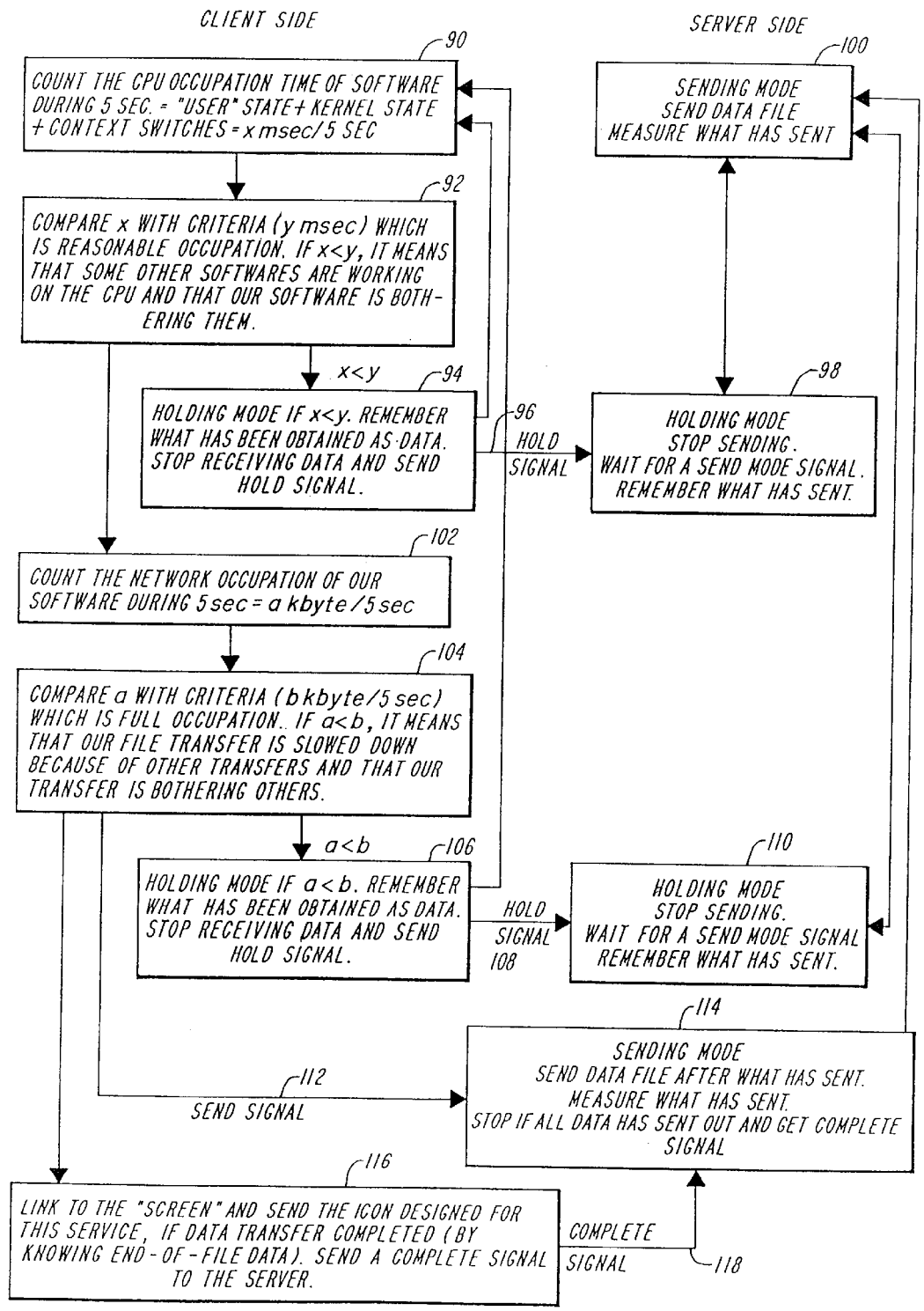

FIG. 6 is a diagram of the subject system indicating the utilization of a subscriber system in which a client subscribes to a service which provides requested information or data from a server, followed by authorization and activation, followed by the smart delivery of information based on the system described in FIGS. 3, 4, and 5; and, FIG. 7 is a flow chart indicating a system for ascertaining the state of the client side and network as to the busyness of the two.

DETAILED DESCRIPTION

Figure 1:
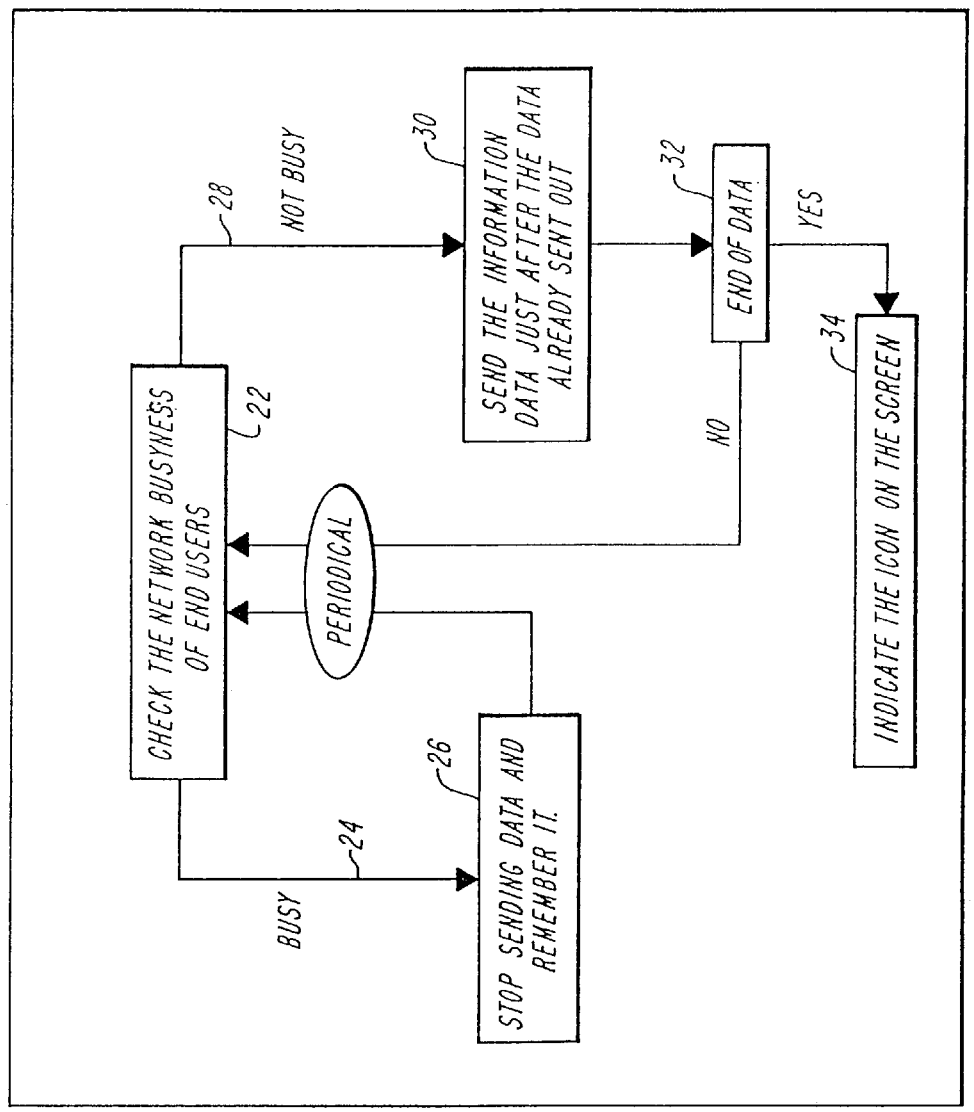
FIG. 1 is a block diagram of the subject system indicating non-realtime transmission of data to an end user's terminal from a server which checks the network and terminal busy condition in order to inhibit the sending of data until such time as both the terminal and network can accommodate the transfer.
Figure 1:
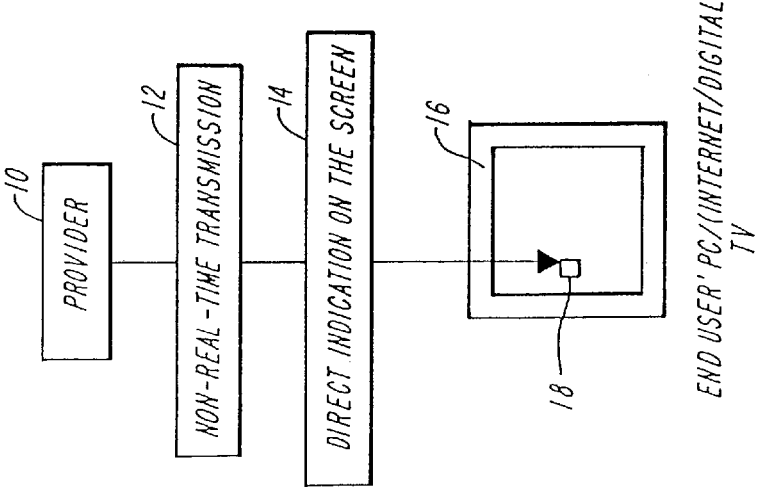

Referring now to FIG. 1, in the subject system a provider 10 provides data through non-realtime transmission 12, with a direct indication of the arrival of the information 14 being provided at an end user's screen 16. In this example, the direct indication that information exists from the provider is provided by icon 18.

The non-realtime transmission, as mentioned before, permits full-frame video, JPEG and MPEG transmissions, and in fact, any other information-dense transmission to be sent from the provider to the end user at such times as the network and the end user can accommodate the transmission.

This is accomplished in one embodiment through a network/terminal busy detector 20 which both checks the network busyness and the state of the computer at the user's terminal through a unit 22 which periodically checks both the network occupation and the state of the CPU at the client side. Upon sensing a busy condition as illustrated by arrow 24, a hold signal is sent at 26 to inhibit the transmission of the provider's information and to store it at the server, with the remaining information to be sent only when a "not busy" indication 28 is generated. Upon receipt of the "not busy" signal, the information is sent as illustrated at 30, or at least that portion of the information that has not already been sent. When this information is sent, an "end-of-data" state is sensed at 32 and if the data is complete, icon 18 on screen 16 is activated as illustrated at 34, indicating to the end user that he is in receipt of information from the provider.

Figure 2:
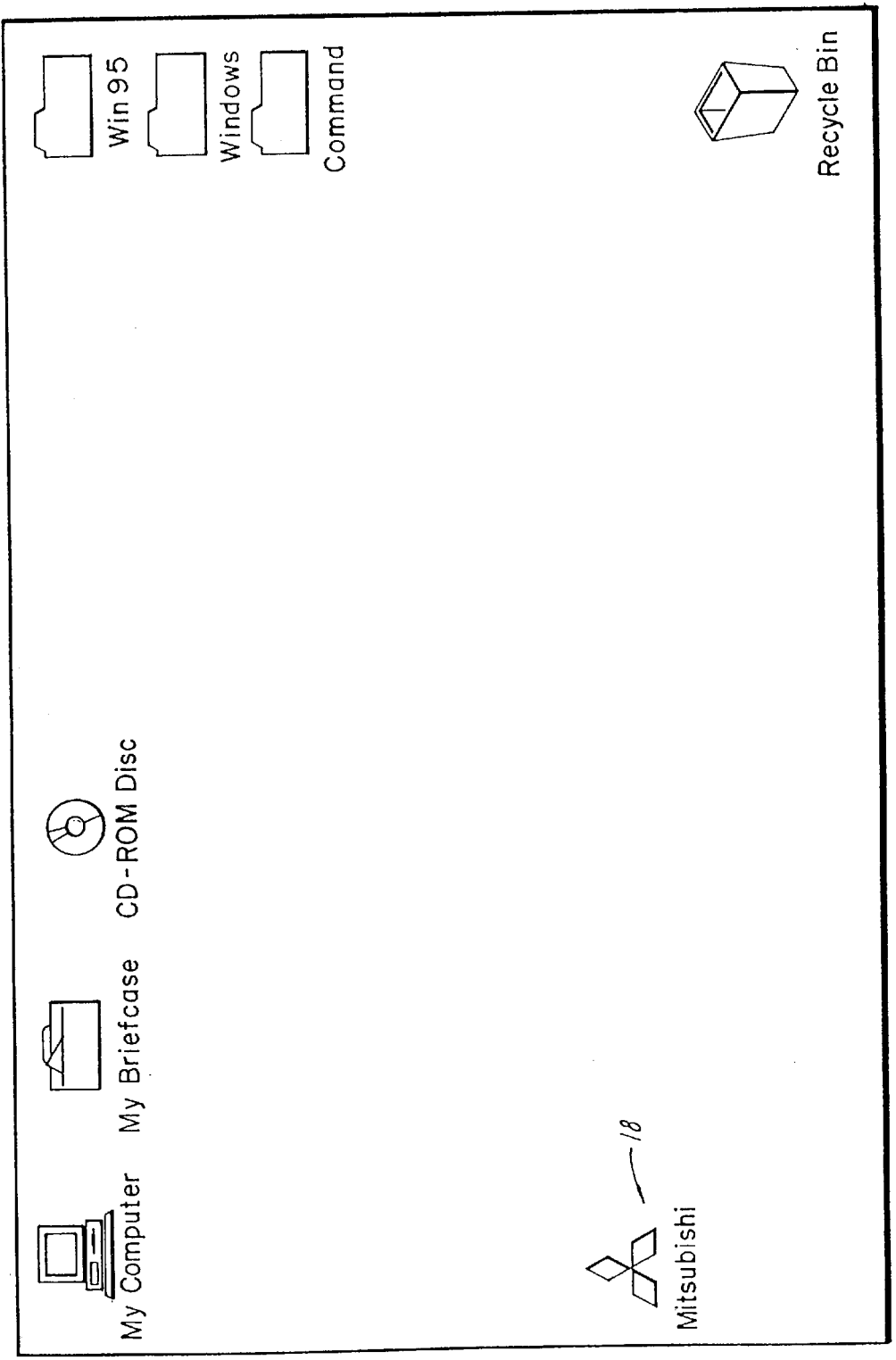
FIG. 2 is a front view of a terminal indicating the provision of an icon by the subject system in which the icon's existence indicates the existence of data from a server, clicking on the icon providing the end user with the transmitted data.

Such an indication is illustrated at FIG. 2 which is a screen shot of a typical computer screen, with the existence of icon 18 indicating that data has been sent and is now available to the end user. This is not a realtime system, but rather one in which the data is stored locally at the user's CPU to accommodate information-dense transmissions such as full-frame video, audio, and JPEG or other pictures as well as straight textual data.

By merely double clicking on the icon, the end user is then presented with the data from the provider, which data may be on a subscription or other basis. When the data is provided on a subscription basis, it is only transmitted to the user upon activation of the system and end user authentication. What this means is that on a subscription basis, costly data can be securely transmitted and stored locally, with access to the data being by merely double clicking on the icon.

As will be appreciated, what this presents to the user is a simplified system for accessing data which he has paid for or authorized to be sent. No longer must the user click through a number of windows or folders in order to be able to access the data for which he has paid.

More specifically, and referring now to FIG. 3, a network 40 connects provider 42 through its associated server 44 to a terminal 46 driven by local storage 48 and an icon drive 50 under control of signals to and from the server. It will be appreciated that through a system to be described hereinafter terminal 46 can indicate that it is running an application and is therefore busy, or at least too busy to accept incoming messages. This is accomplished through the generation of a busy signal 52 which may be in the form of a hold signal transmitted over the network to server 44 which detects this busy signal along with a signal indicating the degree of network occupation. If an application is running on the client side such as to prevent the inflow of information to the CPU at the client side, or if the network occupation is too high, then server 44 stores and holds the content to be transmitted from the provider to the client until such time as the "busyness" factor drops below a predetermined level. At this time, server 44 transmits video, audio, hyper-text or other information to local storage 48 via network 40 so that this information can be accessed at the convenience of the user through the double clicking on the icon.

This double clicking on the icon is illustrated in FIG. 4 to be an icon indicating, for instance, a commercial such as a Bud Light commercial, the icon being indicated at 60. Upon double clicking as by arrow 62 on this icon, the user is presented with the full commercial as illustrated at 64 in FIG. 5. What will be appreciated is that the multi-media transmission from the server can be accessed by the end user by a simple button click on an icon provided by the server and thus the provider. What is eliminated by this system is annoyance of the end user because the network cannot accommodate the transmission of the data, much less receipt of the data by his/her CPU.

Referring now to FIG. 6, one such system for the authorization and subscription to such a service is illustrated in which the client registers for membership as illustrated at 70, with activation and a preference set being recorded at 72 to provide the active services 74. This is accomplished by the customer 76 providing a registration card and telephone number to the provider, in this case, company 78, which in turn mails a membership software disk 80 back to customer 76.

Upon receipt of the software disk, the customer loads the software in an activation step as illustrated at 82 which provides the information back to company 78. The company then provides a confirmation notice 80 back to customer 76 to confirm an active connection, an IP address and modem option set for the interactive communication between the customer and the provider.

Thereafter, company 78, through its server, provides the information and active services requested as illustrated at 82 with the delivery being a so-called smart delivery in that it is provided to the customer locally and stored only when the customer is ready to receive the information. Its existence is also indicated to the user by an on-screen icon which remains on the customer's screen upon booting of his/her system.

When the customer seeks to download or read out this information, the customer merely clicks on the icon which results in the presentation of the associated information. Simultaneously, and for billing purposes a signal is sent back to the company as illustrated at 84 to charge the customer for the services that he/she has requested.

Referring now to FIG. 7, one type of system for ascertaining the "busyness" of both the terminal and the network is illustrated. Here, on the client side as illustrated at 90 the CPU occupation time of the software running is counted during the preceding five seconds and a number is developed reflective of user state, plus Kernel state, plus Context switches. This is compared at 92 with criteria indicating a reasonable occupation or threshold, at which time the server is provided with a signal at 94 to indicate that the terminal and the CPU associated therewith is busy. This is a hold signal 96 which is sent over the network to the server side at 98 to request a hold mode in which the information to be sent is inhibited at 100 until such time as the hold mode signal is extinguished or deleted.

Additionally, on the client side, network occupation is also sensed at 102 which counts the number of bits and incoming data and compares it at 104 with a preset criteria indicating network occupation. When the network is too busy to accommodate the incoming transmission, a second hold signal is generated at 106 to hold the transmission at 108. At this time, a second hold operation at 110 is transmitted back to unit 100 to prevent the transmission of the information. Assuming both of the criteria mentioned above are met, a send signal is transmitted at 112 to the server side which is received at 114 to instruct unit 100 to send either all of the original data or that portion of the data which has not previously been sent. After the client side has received the data, there is a link to the screen which presents an icon indicating receipt of information at the client side, with the client side then sending a "message-complete" signal at 116 over line 118 back to unit 114 to indicate to the server that the message transfer has been completed.

A program listing for the system is now presented:

```
// atpsock.h : interface of the CAtpSocket class
#ifndef ___ATPSOCK_H___
#define ___ATPSOCK_H___
#include "stdafx.h"
#include "afxsock.h"
#include "callback.h"
#include "idfserver.h"
typedef long AtpConnUID;
class AtpConnection {
public:
    enum AtpState {
        CONNECTING,   // Connection just created
        WAITING,      // Connection established; waiting for transfer
        RECEIVING,    // Transfering data
        PAUSED,       // Transfer paused for some reason
        CLOSING       // Connection will be closed
    };
    AtpConnUID uid;
    AtpState state;
```

```
        CString host;
        IDFile *idf;            // Valid only if RECEIVING, PAUSED, or CLOSING
};
// MS compiler buggy: this HAS to be a constant in the class
#define bufsize 1024
class CAtpSocket : pubiic CAsyncSocket
{
private:
        CAtpSocket(const CAtpSocket& rSrc);      // no implementation
        void operator=(const CAtpSocket& rSrc);  // no implementation
        // Construction
public:
        CAtPSocket(ISockCallback*, IAtpCallback*);
        void Initialize(IDFServer *server);
        // Attributes
private:
        long data_len;
        char buf[bufsize], *data;
        CString line, recv_buf, send_buf;
        // Connection state
        enum ( ATP_CONTROL, ATP_DATA ) atp_mode;
        enum ( ATP_START, ATP_LOGIN, ATP_RCPT,
            ATP_FILE, ATP_BLKSIZE, ATP_READY ) atp_state;
        AtpConnection conn;
        ISockCallback *m_pSCB;
        IAtpCallback *m_pCB;
        IAtpProgressCallback *m_pPCB;
        CString ffrom, fuser;
        CString fname;
        long fsize, fchksum, fbsize;
        CTime fdate;
        long fblk, fblksize;
        IDFServer *idfs;
        IDFile *idf;
        // Overridable callbacks
protected:
        virtual void OnReceive(int nErrorCode);
        virtual void OnSend(int nErrorCode);
        virtual void OnClose(int nErrorCode);
        // Implementation
public:
        virtual ~CAtpSocket( );
#ifdef _DEBUG
        virtual void AssertValid( ) const;
        virtual void Dump(CDumpContext& dc) const;
#endif
private:
        void InitNewFile( );
        void FindIDFile ( );
        void FatalError(int nErrorCode);
        void SendString(CString data);
        void TryToSend( );
        CString ExtractLine( );
        CString ExtractWord( );
        BOOL handleControl( );
        BOOL handleData( );
        void SendResponse(int num);
        void SendResponse(int num, CString msg);
        void SendResponse(int num, long arg);
        void SendMultilineResponse(int num, CString data);
        void handleCommandFrom( );
        void handleCommandUser( );
        void handleCommandName( );
        void handleCommandFile( );
        void handleCommandBlkSize( );
        void handleCommandReady( );
        void handleCommandData( );
        void handleCommandAbort( );
        void handleCommandReset( );
        void handleCommandExit( );
};
#endif // ___ATPSOCK_M___
ATP_RESPONSE(200,Command_Okay)
ATP_RESPONSE(202,Command_not_implemented_superfluous_at_this_site)
ATP_RESPONSE(500,Syntax_error_command_unrecognized)
ATP_RESPONSE(501,Syntax_error_in_parameters_or_arguments)
ATP_RESPONSE(502,Command_not_implemented)
ATP_RESPONSE(503,Bad_sequence_of_commands)
ATP_RESPONSE(312,File_status)
```

-continued

```
ATP_RESPONSE(220,ATP_server_ready)
ATP_RESPONSE(221,Closing_control_connection)
ATP_RESPONSE(521,Emergency_closing_of_control_connection)
ATP_RESPONSE(222,Block_size_accepted)
ATP_RESPONSE(422,Block_size_not_acceptable)
ATP_RESPONSE(522,Block_size_already_set_permanently)
ATP_RESPONSE(223,File_completed)
ATP_RESPONSE(323,Block_requested)
ATP_RESPONSE(423,Machine_busy_Please_stall)
ATP_RESPONSE(523,Local_error)
ATP_RESPONSE(224,Data_transfer_aborted)
ATP_RESPONSE(424,Local_file_error)
ATP_RESPONSE(125,Data_transfer_starting)
ATP_RESPONSE(225,Data_transfer_completed)
ATP_RESPONSE(228,File_information_cleared)
ATP_RESPONSE(230,User_logged_in)
ATP_RESPONSE(530,Not_logged_in)
ATP_RESPONSE(233,Recipient_okay)
ATP_RESPONSE(533,Unknown_recipient)
ATP_RESPONSE(354,File_information_okay_awaiting_completion)
ATP_RESPONSE(254,File_information_okay)
ATP_RESPONSE(554,File_has_already_been_uploaded)
ATP_RESPONSE(000,Unknown_Response)
// atpdata.h : essential definitions for the ATP protocol
#ifndef _ATPDATA_H_
#define _ATPDATA_H_
// Commands
const char *AtpCommands[ ] = {
    "FROM", "USER", "NAME", "FILE", "MODE",
    "TYPE", "BLKSIZE", "READY", "DATA", "ABORT",
    "RESET", "EXIT"
};
const int ATP_UNKNOWN_ID = -1;
enum AtpCommandID {
    ATP_FROM_ID,
    ATP_USER_ID,
    ATP_NAME_ID,
    ATP_FILE_ID,
    ATP_MODE_ID,
    ATP_TYPE_ID,
    ATP_BLKSIZE_ID,
    ATP_READY_ID,
    ATP_DATA_ID,
    ATP_ABORT_ID,
    ATP_RESET_ID,
    ATP_EXIT_ID,
    ATP_ID_NUM
};
struct AtpResponse {
    int id;
    char *message;
};
// JRW Macros to define AtpResponses entries ...
#define ATP_RESPONSE(value,symbol) \
const int atp##symbol = (value);
#include    "atpdatadef.h"
#undef   ATP_RESPONSE
#define  ATP_RESPONSE(value,symbol) \
    {atp##symbol, #symbol "."},
AtpResponse AtpResponses[ ] = {
#include    "atpdatadef.h"
};
#endif // _ATPDATA_H_
// atpsock.cpp : implementation of the CAtpSocket class
#include <stdlib.h>
#include "stdafx.h"
#include <assert.h>
#include "atpsock.h"
#include "atpdata.h"
CAtpSocket::CAtpSocket(ISockCallback *pSCB, IAtpCallback* pCB) {
    m_pCB = pCB;
    m_pSCB = pSCB;
    atp_mode = ATP_CONTROL;
    atp_state = ATP_START;
    idf = NULL;
    idfs = NULL;
    data = NULL;
    InitNewFile( );
}
```

-continued

```
void CAtpSocket::Initialize(IDFServer *server) {
    idfs = server;
    SendResponse(atpATP_server_ready);
}
///////////////////////////////////////////////////////////////
// CAtpSocket Overridable callbacks
void CAtpSocket::OnReceive(int nErrorCode) {
    CAsyncSocket::OnReceive(nErrorCode);
    int len;
    if (nErrorCode) {
        FatalError(nErrorCode);
        return;
    }
    // Read all the available data in the buffer
    while (1) {
        len = Receive(buf, bufsize);
        if (!len || len == SOCKET_ERROR) break;
        CString tmp(buf, len);
        recv_buf += tmp;
    }
    BOOL ret = TRUE;
    while (ret)
        switch (atp_mode) {
        case ATP_CONTROL:
            ret = handleControl( );
            break;
        case ATP_DATA:
            ret = handleData( );
            break;
        }
    return;
}
void CAtpSocket::OnSend(int nErrorCode) {
    CAsyncSocket::CnSend(nErrorCode);
    if (nErrorCode) {
        FatalError(nErrorCode);
        return;
    }
    TryToSend( );
}
void CAtpSocket::OnClose(int nErrorCode) {
    CAsyncSocket::OnClose(nErrorCode);
    m_pSCB->ProcessClose(this);
}
///////////////////////////////////////////////////////////////
// CSocket Implementation
CAtpSocket::~CAtpSocket( ) {
    if (data) delete data;
    data = NULL;
}
void CAtpSocket::FatalError(int nErrorCode) {
        nErrorCode;
}
void CAtPSocket::TryToSend( ) {
    int len, strlen;
    strlen = send_buf.GetLength( );
    if (strlen == 0) return;
    const char *bufptr = (LPCTSTR) send_buf;
    len = Send(bufptr, strlen);[001b]
    if (len == SOCKET_ERROR) return;
    send_buf = send_buf.Mid(len);
}
void CAtpSocket::SendString(CString data) {
    send_buf += data;
    TryToSend( );
}
CString CAtpSocket::ExtractLine( ) {
    CString tmp;
    int pos = recv_buf.Find("\r\n");
    if (pos < 0) return tmp;
    tmp = recv_buf.Left(pos+2);
    recv_buf = recv_buf.Mid(pos+2);
    return tmp;
}
CString CAtpSocket::ExtractWord( ) {
    CString tmp;
    line.TrimLeft( );
    int pos = line.Find(" ");
    if (pos < 0) pos = line.GetLength( ) -1;
```

-continued

```
        tmp = line.Left(pos+1);
        line = line.Mid(pos+1);
        tmp.TrimRight( );
        return tmp;
}
BOOL CAtpSocket::handleControl( ) {
        line = ExtractLine( );
        if (line.IsEmpty( )) return FALSE;
        line = line.Left(line.GetLength( ) -2);
        line.TrimRight( );
        CString command = ExtractWord( );
        int command_id = ATP_UNKNOWN_ID;
        for (int i = 0; i < ATP_ID_NUM; i++)
            if (!command.CompareNoCase(AtpCommands[i])) {
                command_id = i;
                break;
            }
        switch (command_id) {
        case ATP_UNKNOWN_ID:
            SendResponse(atpSyntax_error_command_unrecognized);
            break;
        case ATP_FROM_ID:
            handleCommandFrom( );
            break;
        case ATP_USER_ID:
            handleCommandUser( );
            break;
        case ATP_NAME_ID:
            handleCommandName( );
            break;
        case ATP_FILE_ID:
            handleCommandFile( );
            break;
        case ATP_BLKSIZE_ID:
            handleCommandBlkSize( );
            break;
        case ATP_READY_ID:
            handleCommandReady( );
            break;
        case ATP_DATA_ID:
            handleCommandData( );
            break;
        case ATP_ABORT_ID:
            handleCommandAbort( );
            break;
        case ATP_RESET_ID:
            handleCommandReset( );
            break;
        case ATP_EXIT_ID:
            handleCommandExit( );
            break;
        case ATP_MODE_ID:
        case ATP_TYPE_ID:
        default:
            SendResponse(atpCommand_not_implemented_superfluous_at_this_site);
            break;
        }
        return TRUE;
}
BOOL CAtpSocket::handleData( ) {
        long rest = fblksize - data_len;
        if (recv_buf.GetLength( ) < rest)
            rest = recv_buf.GetLength( );
        memcpy(data + data_len, recv_buf, rest);
        recv_buf = recv_buf.Mid(rest);
        data_len += rest;
        if (data_len == fblksize) {
            idf->WriteBlock(fblk, data);
            fblk = -1;
            SendResponse[001b](atpData_transfer_completed);
            atp_mode = ATP_CONTROL;
            // making finalization explicit
            long blk = idf->GetEmptyBlock( );
            if (blk < 0) idf->Finalize( );
            return TRUE;
        }
        return FALSE;
}
void CAtpSocket::handleCommandFrom( ) {
```

-continued

```
    CString from, pass;
    if (atp_state != ATP_START) {
        SendResponse(atpBad_sequence_of_commands);
        return;
    }
    if (line.IsEmpty( )) {
        SendResponse(atpSyntax_error_in_parameters_or_arguments);
        return;
    }
    from = ExtractWord( );
    pass = line;
    line.Empty( );
    // no authentication so far
    ffrom = from;
    SendResponse(atpUser_logged_in);
    atp_state = ATP_LOGIN;
}
void CAtpSocket::handleCommandUser( ) {
    CString to;
    if (atp_state != ATP_LOGIN) {
        SendResponse(atpBad_sequence_of_commands);
        return;
    }
    if(line.IsEmpty( )) {
        SendResponse(atpSyntax_error_in_parameters_or_arguments);
        return;
    }
    to = ExtractWord( );
    if (!line.IsEmpty( )) {
        SendResponse(atpSyntax_error_in_parameters_or_arguments);
        return;
    }
    // no recipient verification yet
    fuser = to;
    SendResponse(atpRecipient_okay);
    atp_state = ATP_RCPT;
    InitNewFile( );
}
void CAtpSocket::InitNewFile( ) {
    fname = " ";
    fsize = 0;
    fbsize = 0;
    fchksum = 0;
    idf = NULL;
    fblk = -1;
}
void CAtpSocket::handleCommandName( ) {
    CString name;
    if (atp_state != ATP_RCPT) {
        SendResponse(atpBad_sequence_of_commands);
        return;
    }
    if (line.IsEmpty( )) {
        SendResponse(atpSyntax_error_in_parameters_or_arguments);
        return;
    }
    name = line;
    line.Empty( );
    // ++ Check validity here
    fname = name;
    if (fsize > 0) {
        SendResponse(atpFile_information_okay);
        atp_state = ATP_FILE;
    }
    else
        SendResponse(atpFile_information_okay_awating_completion);
}
void CAtpSocket::handleCommandFile( ) {
    long size, chksum;
    CString tmp;
    if (atp_state != ATP_RCPT) {
        SendResponse(atpBad_sequence_of_commands);
        return;
    }
    if (line.IsEmpty( )) {
        SendResponse(atpSyntax_error_in_parameters_or_arguments);
        return;
    }
    tmp = ExtractWord( );
```

-continued

```
        size = atol(tmp);
        chksum = 0;
        tmp = ExtractWord( );
        if (!tmp.IsEmpty( ))
            chksum = atol(tmp);
        fsize = size;
        fchksum = chksum;
        if (!fname.IsEmpty( )) {
            SendResponse(atpFile_information_okay);
            atp_state = ATP_FILE;
        }
        else
            SendResponse(atpFile_information_okay_awating_completion);
}
void CAtpSocket::FindIDFile( ) {
        if (idf) return;
        IDFile *idftmp = new IDFile(fname, fsize, fchksum);
        IDFile *oldidf = idfs->FindIDFile(idftmp);
        if (oldidf != NULL) {
            delete idftmp;
            idf = oldidf;
        }
        else
            idf = idftmp;
}
void CAtpSocket::handleCommandBlkSize( ) {
        CString tmp;
        long bsize, sbsize;
        if (atp_state != ATP_FILE) {
            SendResponse(atpBad_sequence_of_commands);
            return;
        }
        if (line.IsEmpty( )) {
            SendResponse(atpSyntax_error_in_parameters_or_arguments);
            return;
        }
        tmp = ExtractWord( );
        bsize = atol(tmp);
        FindIDFile( );
        if (idf->IsFinalized( ) || idf->IsBound( )) {
            sbsize = idf->GetBlockSize( );
            if (sbsize == bsize) {
                SendResponse(atpBlock_size_accepted, sbsize);
                fbsize = bsize;
                atp_state = ATP_BLKSIZE;
            } else
                SendResponse(atpBlock_size_already_set_permanently, sbsize);
            return;
        }
        sbsize = idf->SetBlockSize(bsize);
        if (sbsize != bsize) {
            // suggested size from the IDFile implementation
            SendResponse(atpBlock_size_not_acceptable, sbsize);
            return;
        }
        fbsize = bsize;
        SendResponse(atpBlock_size_accepted, fbsize);
        atp_state = ATP_BLKSIZE;
        idfs->Add(idf);     // ++ error checking here perhaps
        // (although this is verified at a later stage)
}
void CAtpSocket::handleCommandReady( ) {
        assert(fbsize > 0 && idf != NULL);
        if (atp_state != ATP_BLKSIZE) {
            SendResponse(atpBad_sequence_of_commands);
            return;
        }
        if (!idf->IsBound( ) && !idfs->Add(idf)) {
            SendResponse(434);
            return;
        }
        long blk = idf->GetEmptyBlock( );
        if (blk < 0) {
            SendResponse(atpFile_completed);
            idf->Finalize( );
            return;
        }
        fblksize = idf->GetBlockSize(blk);
        long stall = m_pCB->RequestTransfer(fblksize);
```

```
        if (stall < 0)
            // The control proc will invoke a reply later
            return;
        if (stall > 0) {
            SendResponse(atpMachine_busy_Please_stall, stall);
            return;
        }
        (data) delete[ ] data;
        data = new char(fblksize);
        if (!data) {
            SendResponse(atpLocal_error);
            return;
        }
        fblk = blk;
        SendResponse(atpBlock_requested, fblk);
        atp_state = ATP_READY;
}
void CAtpSocket::handleCommandData( ) {
        CString tmp;
        long bsize;
        assert( fblk >= 0 && fblk <= (fsize-1)/fbsize );
        if (atp_state != ATP_READY) {
            SendResponse(atpBad_sequence_of_commands);
            return;
        }
        tmp = ExtractWord( );
        bsize = atol(tmp);
        if (bsize != fblksize) {
            SendResponse(atpBlock_size_not_acceptable, fblksize);
            return;
        }
        long stall = m_pCB->RequestTransfer(fblksize);
        if (stall < 0)
            // The control proc will invoke a reply later
            return;
        if (stall > 0) {
            SendResponse(atpMachine_busy_Please_stall, stall);
            return;
        }
        SendResponse(atpData_transfer_starting);
        data_len = 0;
        atp_mode = ATP_DATA;
        atp_state = ATP_BLKSIZE;
}
void CAtpSocket::handleCommandAbort( ) {
        if (atp_state != ATP_READY) {
            SendResponse(atpBad_sequence_of_commands);
            return;
        }
        fblk = -1;
        SendResponse(atpData_transfer_aborted);
        atp_state = ATP_BLKSIZE;
}
void CAtpSocket::handleCommandReset( ) {
        if (atp_state == ATP_START || atp_state == ATP_LOGIN) {
            SendResponse(atpBad_sequence_of_commands);
            return;
        }
        SendResponse(atpFile_intormation—cleared);
        InitNewFile( );
        atp_state = ATP_RCPT;
}
void CAtpSocket::handleCommandExit( ) {
        SendResponse(atpClosing_control_connection);
        Close( );
        atp_state = ATP_START;
}
void CAtpSocket::SendResponse(int num) {
        for (int i = 0;; i++)
            if (AtpResponses[i].id == num || !AtpResponses[i].id) {
                CString tmp;
                tmp.GetBuffer(1024);
                tmp.Format("%d    %s\r\n", num, AtpResponses[i].message);
                SendString(tmp);
                return;
            }
}
void CAtpSocket::SendResponse(int num, CString msg) {
        CString tmp;
```

-continued

```
        tmp.GetBuffer(1024);
        tmp.Format("%d    %s\r\n", num, msg);
        SendString(tmp);
}
void CAtpSocket::SendResponse(int num, long arg) {
    for (int i = 0;; i++)
        if (AtpResponses[i].id == num || !AtpResponses[i].id) {
            CString tmp;
            tmp.GetBuffer(1024);
            tmp.Format("%d    (%1d) %s\r\n", num, arg, AtpResponses[i].message);
            SendString(tmp);
            return;
        }
}
void CAtpSocket::SendMultilineResponse(int num, CString data) {
    for (int i = 0;; i++)
        if (AtpResponses[i].id == num || !AtpResponses[i].id) {
            CString tmp;
            tmp.GetBuffer(8196);
            tmp.Format("%d-   %s\r\n%s\r\n%d    %s",
                num, AtpResponses [i].message, data,
                num, AtpResponses[i].message);
            SendString(tmp);
            return;
        }
}
#ifdef _DEBUG
void CAtpSocket::AssertValid( ) const
{
    CAsyncSocket::AssertValid( );
}
void CAtpSocket::Dump(CDumpContext& dc) const
{
    CAsyncSocket::Dump(dc);
}
#endif //_DEBUG
//
// C++ header file
// (c) 1996 ACS
//
#ifndef _IDFSERVER_H_
#define _IDFSERVER_H_
#include "stdafx.h"
#include "callback.h"
#include "options.h"
class IDFile {
private:
    IDFile(const IDFile&);   // no implementation
    void operator=(const IDFile&);   // no implementation
public:
    IDFile( );
    IDFile(IIDFCallback *pCB, CString idfname);
    IDFile(CString name, long size, long chksum = 0);
    ~IDFile( );
    BOOL operator==(const IDFile& comp) const;
    BOOL SetFileInfo(CString name, long size, long chksum = 0);
    long GetBlockSize(long blk = -1) const;
    long SetBlockSize(long bsize);
    BOOL IsBound( ) const;
    BOOL CreateIDF(IIDFCallback *pCB, CString tempdir);
    long GetBlockNum( ) const;
    long GetEmptyBlockNum( ) const;
    BOOL GetBlockState(long bnum) const;
    long GetEmptyBlock( ) const;
    BOOL WriteBlock(long bnum, const void *buf);
    BOOL IsFinalized( ) const;
    BOOL Finalize( );
public:
    friend CDumpContext& operator<<(CDumpContext& cout, const IDFile& idf);
private:
    friend CArchive& operator<<(CArchive& cout, const IDFile& idf);
    friend CArchive& operator>>(CArchive& cin, IDFile& idf);
private:
    IIDFCallback *m_pCB;
public:
    // file info
    CString fname, tempname;
    long fsize, fchksum;
    long fbsize;
```

-continued

```
private:
    // internal state
    BOOL fbound, ffinalized;
    CFile *idfile, *ffile;
    long btable_len, first_free, empty_num;
    int *btable;
private:
    void Initialize( );
    void Store( );
    void Restore(CString idfname);
};
class IDFServer {
private:
    IDFServer(const IDFServer&);      // no implementation
    void operator=(const IDFServer&); // no implementation
public:
    IDFServer(IIDFCallback *pCB, COptions *opts);
    ~IDFServer( );
    IDFile *FindIDFile(IDFile *idf);
    BOOL Add(IDFile *idf);
    // Implementation:
private:
    IIDFCallback *m_pCB;
    COptions *options;
    CptrArray idfs;
private:
    void LoadIDFiles(CString dir);
};
#endif // _IDFSERVER_H_
// End of headers
// callback defintions
//
// C++ header file
// (c) 1996 ACS
//
#ifndef _CALLBACK_H_
#define _CALLBACK_H_
// Callback for socket connections.
// Classes using sockets should inherit this.
class ISockCallback {
public:
    virtual void ProcessPendingAccept(CAsyncSocket *sock) ( sock; );
    virtual void ProcessAcceptError(CAsyncSocket *sock, int nErrorCode) ( sock; nErrorCode)
    virtual void ProcessPendingData(CAsyncSocket *sock) ( sock; );
    virtual void ProcessClose(CAsyncSocket *sock) ( sock; )
};
// Callback for IDF observers
class IDFile;
classIIDFCallback {
public:
    virtual void ProcessDownloadedFile(IDFile *idf) ( idf; );
    virtual void ProcessWrittenBlock(IDFile *idf) ( idf; );
};
// Callback for ATP protocol controllers
class IAtpCallback {
public:
    // verifyUser should be in IDFServer, actually
    //virtual BOOL VerifyUser(CString from, CString user) ( return TRUE; )
    // Return suggested stall in seconds. 0 = OK
    virtual long RequestTransfer(long size) ( size; return 0; )
};
class AtpConnection;
// To be inherited by the Atp observer
class IAtpProgressCallback {
public:
    virtual void ProcessConnectionState(const AtpConnection& conn);
};
// To be inherited by the Atp Socket controller
class IAtpStateCallback {
    virtual BOOL GetConnectionState(long uid, AtpConnection*& conn);
    virtual int GetAllConnectionStates(AtpConnection*& conn);
};
#endif // _CALLBACK_H_
// End of headers
// IDFServer.cpp : Implementation of the IDFServer and IDFile classes
// C++ code file
// (c) 1996 ACS
//
#include "stdafx.h"
```

-continued

```
#include "IDFServer.h"
// IDFile Implementation
IDFile::IDFile( ) {
    Initialize( );
}
IDFile::IDFile(CString name, long size, long chksum) {
    Initialize( );
    fname = name;
    fsize = size;
    fchksum = chksum;
}
IDFile::IDFile(IIDFCallback *pCB, CString idfname) {
    Initialize( );
    m_pCB = pCB;
    Restore(idfname);
}
IDFile::~IDFile( ) {
    if (ffile) delete ffile;
    if (idfile) delete idfile;
    if (btable) delete btable;
}
void IDFile::Initialize( ) {
    fbound = ffinalized = FALSE;
    idfile = ffile = NULL;
    btable = NULL;
    fname = tempname = " ";
    fsize = fbsize = fchksum = 0;
    btable_len = first_free = 0;
}
void IDFile::Store( ) {
    if (!fbound && !ffinalized ) return;
    idfile->SeekToBegin( );
    CArchive idfarchive(idfile, CArchive::store);
    idfarchive << *this;
    idfarchive.Flush( );       // JRW Archive file
    idfile->Flush( );          // JRW IDF file.
    idfile->SetLength(idfile->GetPosition( ));
}
void IDFile::Restore(CString idfname) {
    CFileException e;
    idfile = new CFile( );
    if (!idfile->Open(idfname, CFile::modeCreate | CFile::modeNoTruncate |
            CFile::modeReadWrite | CFile::shareDenyWrite, &e)) {
        delete idfile;
        idfile = NULL;
        throw new CFileException( );
    }
    idfile->SeekToBegin( );
    CArchive idfarchive(idfile, CArchive::load);
    idfarchive >> *this;
    if (fbound) {
        ffile = new CFile( );
        if (!ffile->Open(tempname, CFile::modeCreate | CFile::modeNoTruncate |
                CFile::modeWrite | CFile::shareDenyWrite, &e)) {
            delete ffile;
            ffile = NULL;
            throw new CFileException( );
        }
    }
}
BOOL IDFile::operator==(const IDFile& comp) const {
    return (fname == comp.fname && fsize == comp.fsize &&
            fchksum == comp.fchksum);
}
BOOL IDFile::SetFileInfo(CString name, long size, long chksum) {
    if (fbound || ffinalized) return FALSE;
    fname = name;
    fsize = size;
    fchksum = chksum;
    return TRUE;
}
long IDFile::SetBlockSize(long bsize) {
    if (!fbound && !ffinalized)
            fbsize = bsize;
    return fbsize;
}
BOOL IDFile::IsBound( ) const {
    return fbound;
}
```

-continued

```
BOOL IDFile::CreateIDF(IIDFCallback *pCB, CString tempdir) {
    if (fbound || ffinalized) return FALSE;
    if (fname.IsEmpty( ) || fsize <= 0 || fbsize <= 0) return FALSE;
    m_pCB = pCB;
    CFileException e;
    // open the real file
    char tmp[MAX_PATH];
    if (!GetTempFileName(tempdir, fname, 0, tmp)) return FALSE;
    tempname = tmp;
    ffile = new CFile( );
    if (!ffile->Open(tempname, CFile::modeCreate | CFile::modeWrite |
            CFile::shareDenyWrite, &e)) {
        delete ffile;
        ffile = NULL;
        return FALSE;
    }
    try {
        ffile->SetLength(fsize);
    } catch (CFileException e) {
        delete ffile;
        ffile = NULL;
        return FALSE;
    }
    idfile = new CFile( );
    if (!idfile->Open(tempname + ".idf",
            CFile::modeCreate | CFile::modeReadWrite |
            CFile::shareDenyWrite, &e)) {
        delete ffile;
        delete idfile;
        ffile = idfile = NULL;
        return FALSE;
    }
    fbound = TRUE;
    empty_num = btable_len = (fsize + fbsize-1) / fbsize;
    first_free = 0;
    btable = new int[btable_len];
    for (int i = 0; i < btable_len; i++)
        btable[i] = 0;
    try {
        Store( );
    } catch (CFileException e) {
        // ++ all set, but cannot save status for some reason
    }
    return TRUE;
}
long IDFile::GetBlockNum( ) const {
    return btable_len;
}
long IDFile::GetEmptyBlockNum( ) const {
    return empty_num;
}
int IDFile::GetBlockState(long bnum) const {
    if (bnum < 0 || bnum >= btable_len) return -1;
    return btable[bnum];
}
long IDFile::GetBlockSize(long bnum) const {
    if (bnum == (fsize-1)/fbsize)
        return fsize - fbsize*bnum;
    else
        return fbsize;
}
long IDFile::GetEmptyBlock( ) const {
    if (ffinalized || first_free >= btable_len) return -1;
    return first_free;
}
BOOL IDFile::WriteBlock(long bnum, const void *buf) {
    if (ffinalized) return TRUE;
    if (!fbound) return FALSE;
    if (bnum < 0 || bnum >= btable_len) return FALSE;
    if (btable[bnum]) return TRUE;
    try {
        ffile->Seek(bnum * fbsize, CFile::begin);
        if (bnum + 1 < btable_len)
            ffile->Write(buf, fbsize);
        else
            ffile->Write(buf, fsize % fbsize);
        ffile->Flush( ); // JRW Temp file.
    } catch (CFileException e) {
        return FALSE;
```

-continued

```
        }
        // data written, update status
        btable[bnum] = 1;
        empty_num--;
        if (bnum == first_free)
            while (first_free < btable_len && btable[first_free])
                first_free++;
        if (m_pCB) m_pCB->ProcessWrittenBlock(this);
        // If file is completed attempt finalization
        // or not: make that explicit, finalization can
        // be time intensive -- better take care of the
        // protocol first.
        //
        // if (!empty_num)
        //     Finalize( );
        try {
            Store( );
        } catch (CFileException e) {
            // ++ Status cannot be saved
        }
        return TRUE;
    }
    BOOL IDFile::IsFinalized( ) const {
        return ffinalized;
    }
    BOOL IDFile::Finalize( ) {
        if (ffinalized && m_pCB)
            m_pCB->ProcessDownloadedFile(this);
        if (!fbound) return FALSE;
        if (first_free < btable_len) return FALSE;
        try {
            ffile->Close( );
        } catch (CFileException e) {
            return FALSE;
        }
        fbound = FALSE;
        ffinalized = TRUE;
        delete[ ] btable;
        btable = NULL;
        btable_len = first_free = 0;
        delete ffile;
        ffile = NULL;
        if (m_pCB) m_pCB->ProcessDownloadedFile(this);
        return TRUE;
    }
    // IDFile Serialization
    CDumpContext& operator<<(CDumpContext& cout, const IDFile& idf) {
            idf;
            return cout;
    }
    CArchive& operator<<(CArchive& cout, const IDFile& idf) {
        // Magic number
        cout << 'I' << 'D' << 'F' << '1';
        cout << idf.fbound << idf.ffinalized;
        cout << idf.fsize << idf.fchksum << idf.fbsize;
        cout << idf.btable_len << idf.first_free << idf.empty_num;
        for (int i = 0; i < idf.btable_len; i++)
            cout << idf.btable[i];
        cout.WriteString(idf.fname + "\r\n");
        cout.WriteString(idf.tempname + "\r\n");
        return cout;
    }
    CArchive& operator>>(CArchive& cin, IDFile& idf) {
        if (idf.ffile) delete idf.ffile;
        idf.ffile = NULL;
        if (idf.btable) delete idf.btable;
        idf.btable = NULL;
        char magic[4];
        cin >> magic[0] >> magic[1] >> magic[2] >> magic[3];
        if (magic[0] != 'I' || magic[1] != 'D' ||
            magic[2] != 'F' || magic[3] != '1')
            throw new CFileException( );
        cin >> idf.fbound >> idf.ffinalized;
        cin >> idf.fsize >> idf.fchksum >> idf.fbsize;
        cin >> idf.btable_len >> idf.first_free >> idf.empty_num;
        if (idf.btable_len)
            idf.btable = new int[idf.btable_len];
        for (int i = 0; i < idf.btable_len; i++)
            cin >> idf.btable[i];
```

```
        cin.ReadString(idf.fname);
        cin.ReadString(idf.tempname);
        return cin;
}
// IDFServer Implementation
IDFServer::IDFServer(IIDFCallback *pCB, COptions *opts) {
    m_pCB = pCB;
    options = opts;
    CFileStatus fstat;
    if (CFile::GetStatus(options->IDF_DIRECTORY, fstat))
        if (fstat.m_attribute & CFile::directory) {
            LoadIDFiles(options->IDF_DIRECTORY);
            return;
        }
    throw new CFileException( );
}
IDFServer::~IDFServer( ) {
    for (int i = 0; i < idfs.GetSize( ); i++)
        delete (IDFile *)idfs[i];
    idfs.RemoveAll;
}
void IDFServer::LoadIDFiles(CString dir) {
    WIN32_FIND_DATA fdata;
    HANDLE search_ptr;
    search_ptr = FindFirstFile(dir + "\\*.idf", &fdata);
    if (search_ptr == INVALID_HANDLE_VALUE) return;
    do {
        // verify attributes: is it a writable file?
        if (fdata.dwFileAttributes & FILE_ATTRIBUTE_DIRECTORY ||
            fdata.dwFileAttributes & FILE_ATTRIBUTE_READONLY)
                continue;
        CString filename = dir + "\\" + fdata.cFileName;
        // verify age and delete if too old
        CTime ftime(fdata.ftLastWriteTime);
        if ((CTime::GetCurrentTime( ) - ftime).GetTotalSeconds( ) >
            options->IDF_RECLAIM_TIME) {
            CFile::Remove(filename);
            continue;
        }
        try {
            IDFile *idfile = new IDFile(m_pCB, filename);
            Add(idfile);
        } catch (CFileException e) {
            // well, tough, nothing we can do if we can't read the file
        } catch (CArchiveException e) {
        }
    } while (FindNextFile(search_ptr, &fdata));
    FindClose(search_ptr);
}
BOOL IDFServer::Add(IDFile *idf) {
    if (!idf->IsBound( ) && !idf->IsFinalized( )) {
        if (!idf->CreateIDF(m__pCB, options->IDF_DIRECTORY))
            return FALSE;
    }
    idfs.Add(idf);
    return TRUE;
}
IDFile *IDFServer::FindIDFile(IDFile *idf) {
    for (int i = 0; i < idfs.GetSize( ); i++)
        if (*(IDFile *)idfs[i] == *idf)
            return (IDFile *) idfs[i];
    return NULL;
}
// End of code
//
// C++ header file
// (c) 1996 ACS
//
#ifndef _PACKFILE_H_
#define _PACKFILE_H_
#include "stdafx.h"
typedef WORD UINT16;
typedef DWORD UINT32;
// Oh, how I wish VC++ could place constants in classes
const UINT32 ZipFile_LocSig = 0x04034b50L;
const UINT16 ZipFile_MethodStore = 0;
const UINT16 ZipFile_FlagEncrypted = 1;
const UINT16 ZipFile_FlagExtHeader = 8;
class ZipFile : private CFile {
```

-continued

```
public:
    ZipFile(int hFile);
    ZipFile(CString fname, UINT nOpenFlags = CFile::modeRead);
    virtual ~ ZipFile( );
    BOOL ExtractFiles(CString dir);
private:
    struct ZipFileHeader {
        UINT32 sig;
        UINT16 xxx1;
        UINT16 flags;
        UINT16 method;
        UINT32 time;
        UINT32 crc;
        UINT32 csize;
        UINT32 osize;
        UINT16 namelen;
        UINT16 extralen;
    };
    struct ZipExtHeader {
        char buf[16];
    };
    struct ZipEncryptHeader {
        char buf[12];
    };
    ZipFileHeader ReadHeader( );
    UINT16 ReadShort( );
    UINT32 ReadLong( );
};
#endif // _PACKFILE_H_
// End of headers
//
// C++ code file
// (c) 1996 ACS
//
#include "stdafx.h"
#include "packfile.h"
ZipFile::ZipFile(int hFile)
    : CFile(hFile) {
}
ZipFile::ZipFile(CString fname, UINT nOpenFlags)
    : CFile(fname, nOpenFlags) {
}
ZipFile::~ZipFile( ) {
    ~CFile( );
}
BOOL ZipFile::ExtractFiles(CString dir) {
    int num = 0;
    BOOL badeof, skip;
    const long bufsize = 16384;
    char buf[bufsize];
    ZipFileHeader head;
    ZipEncryptHeader enc; enc;
    ZipExtHeader ext; ext;
    try {
    SeekToBegin( );
    badeof = skip = FALSE;
    while (1) {
        head = ReadHeader( );
        if (head.sig != ZipFile_LocSig) break;
        badeof = TRUE;
        num++;
        // skip encryption header if present
        if (head.flags & ZipFile_FlagEncrypted) {
            skip = TRUE;
            Seek(sizeof(enc), CFile::current);
        }
        skip = skip || (head.method != ZipFile_MethodStore);
        skip = skip || (head.csize != head.osize);
        // read filename
        if (Read(buf, head.namelen) != head.namelen) break;
        // convert the filename to standard form
        // create directories if needed
        CString fname = dir;
        if (!skip) {
            CString tmp(buf, head.namelen);
            int pos;
            while ((pos = tmp.FindOneOf("/\\")) >= 0) {
        fname = fname + "\\" + tmp.Left(pos);
        tmp = tmp.Mid(pos+1);
```

-continued

```
                DWORD attrib = GetFileAttributes(fname);
                if (!(attrib & FILE_ATTRIBUTE_DIRECTORY) ||
                    (attrib == -1 && !CreateDirectory(fname, NULL))) {
            skip = TRUE;
            break;
            }
                }
                fname = fname + "\\" + tmp;
            }
        // create destination file
        CFile file;
        skip = skip || !file.Open(fname, CFile::modeCreate | CFile::modeWrite);
        // transfer contents
        if (skip)
            Seek(head.csize, CFile::current);
        else {
            int left = head.csize;
            while (left) {
        int len = Read(buf, left < bufsize ? left : bufsize);
        if (len == 0) break;
        left -= len;
        file.Write(buf, len);
            }
            file.Close( );
        }
        // skip extended header
        if (head.flags & ZipFile_FlagExtHeader)
            Seek(head.extralen, CFile::current);
        badeof = FALSE;
        }
    } catch (CFileException e) {
        return FALSE;
    }
    return (!badeof && num);
}
ZipFile::ZipFileHeader ZipFile::ReadHeader( ) {
    ZipFileHeader head;
    head.sig = ReadLong( );
    head.xxx1 = ReadShort( );
    head.flags = ReadShort( );
    head.method = ReadShort( );
    head.time = ReadLong( );
    head.crc = ReadLong( );
    head.csize = ReadLong( );
    head.osize = ReadLong( );
    head.namelen = ReadShort( );
    head.extralen = ReadShort( );
    return head;
}
UINT16 ZipFile::ReadShort( ) {
    unsigned char buf[2];
    Read(buf, 2);
    return UINT16(((UINT16) buf[0]) | UINT16( (((UINT16) buf[1]) << 8)));
}
UINT32 ZipFile::ReadLong( ) {
    UINT32 lo = ReadShort( );
    UINT32 hi = ReadShort( ) << 16;
    return lo | hi;
}
// End of code
// Client1.h : main header file for the CLIENT1 application
//
#ifndef __AFXWIN_H__
#error include 'stdafx.h' before including this file for PCH
#endif
#include "resource.h"    // main symbols
#include "callback.h"
#include "options.h"
#include "idfserver.h"
#include "atpsock.h"
#include "socketcontrol.h"
/////////////////////////////////////////////////////////////////////////////
// CClient1:
// See Client1.cpp for the implementation of this class
//
class CClient1 : public CWinApp, IIDFCallback
{
public:
    CClient1( );
```

-continued

```
    // Overrides
    // ClassWizard generated virtual function overrides
    //{{AFX_VIRTUAL(CClient1)
public:
    virtual BOOL InitInstance( );
    //}}AFX_VIRTUAL
    // Implementation
public:
    virtual void ProcessDownloadedFile(IDFile *idf);
private:
    COptions *m_options;
    IDFServer *m_idfserver;
    SocketControl *m_atpserver;
    //{{AFX_MSG(CClient1)
    // NOTE - the ClassWizard will add and remove member functions here.
    //    DO NOT EDIT what you see in these blocks of generated code!
    //}}AFX_MSG
    DECLARE_MESSAGE_MAP( );
};
////////////////////////////////////////////////////////////////////
// Client1.cpp : Defines the class behaviors for the application.
//
#include "stdafx.h"
#include "stdlib.h"
//#include <shlguid.h>
extern "C" {
#include <winnetwk.h>
#include <shellapi.h>
#include <shlobj.h>
#include <objbase.h>
#include <initguid.h>
}
#include "winnls.h"
#include "Client1.h"
#include "Client1Dlg.h"
#include "packfile.h"
#include "ProcessMonitor.h" // JRW 961015
#ifdef _DEBUG
#define new DEBUG_NEW
#undef THIS_FILE
static char THIS_FILE( ) = __FILE__;
#endif
////////////////////////////////////////////////////////////////////
// CClient1
BEGIN_MESSAGE_MAP(CClient1, CWinApp)
    //{{AFX_MSG_MAP(CClient1)
    // NOTE - the ClassWizard will add and remove mapping macros here.
    //    DO NOT EDIT what you see in these blocks of generated code!
    //}}AFX_MSG
    ON_COMMAND(ID_HELP, CWinApp::OnHelp)
END_MESSAGE_MAP( );
////////////////////////////////////////////////////////////////////
// CClient1 construction
CClient1::CClient1( )
{
    // TODO: add construction code here,
    // Place all significant initialization in InitInstance
}
////////////////////////////////////////////////////////////////////
// The one and only CClient1 object
CClient1 theApp;
////////////////////////////////////////////////////////////////////
// CClient1 initialization
BOOL CClient1::InitInstance( )
{
    if (!AfxSocketInit( ))
        {
            AfxMessageBox(IDP_SOCKETS_INIT_FAILED);
            return FALSE;
        }
    coInitialize (NULL);
    // Standard initialization
    // If you are not using these features and wish to reduce the size
    //   of your final executable. you should remove from the following
    //   the specific initialization routines you do not need.
#ifdef _AFXDLL
    Enable3dControls( );    // Call this when using MFC in a shared DLL
#else
    Enable3dControlsStatic( ); // Call this when linking to MFC statically
```

-continued

```
#endif
    CClient1Dlg dlg;
    m_pMainWnd = &dlg;
    m_options = new COptions( );
    m_atpserver = new SocketControl( );
    m_idfserver = new IDFServer(this, m_options);
    if (!m_atpserver->Initialize(m_idfserver)) {
        AfxMessageBox("Cannot bind to socket!");
        return FALSE;
    }
#ifdef PROCESS_MONITOR
        if (!StartMonitorThread( ) }
            {
                AfxMessageBox("Cannot start monitor thread!");
                return FALSE;
            }
#endif           // PROCESS_MONITOR
    int nResponse = dlg.DoModal( );
    if (nResponse == IDOK) {
        // TODO: Place code here to handle when the dialog is
        //   dismissed with OK
    }
    else if (nResponse == IDCANCEL)
        {
            // TODO: Place code here to handle when the dialog is
            //   dismissed with Cancel
        }
    // Since the dialog has been closed, return FALSE so that we exit the
    //  application, rather than start the application's message pump.
    return FALSE;
}
BOOL FileExists(LPCSTR lpszPath) {
    return (GetFileAttributes(lpszPath) != -1);
}
HRESULT CreateLink(LPCSTR lpszPathObj, LPCSTR lpszPathLink,
                    LPCSTR lpszDesc, LPCSTR lpszIcon)
{
    HRESULT hres;
    IShellLink* psl = NULL;
    // Get a pointer to the IShellLink interface.
    hres = CoCreateInstance(CLSID_ShellLink, NULL,
                    CLSCTX_INPROC_SERVER, IID_IShellLink, (void **)&psl);
    if (psl) {
        IPersistFile* ppf = NULL;
        // Set the path to the shortcut target, and add the
        // description.
        psl->SetPath(lpszPathObj);
        psl->SetDescription(lpszDesc);
        if (!lpszIcon || !*lpszIcon) {
            // Add one of our icons
            char myname[MAX_PATH];
            GetModuleFileName(NULL, myname, MAX_PATH);
            hres = psl->SetIconLocation(myname, 1); // need a constant here
        }
        else
            hres = psl->SetIconLocation(lpszIcon, 0);
        // Query IShellLink for the IPersistFile interface for saving the
        // shortcut in persistent storage.
        hres = psl->QueryInterface(IID_IPersistFile, (void **) &ppf);
        if (ppf) {
            WORD wsz[MAX_PATH];
            // Ensure that the string is ANSI.
            MultiByteToWideChar(CP_ACP, 0, lpszPathLink, -1,
                    wsz, MAX_PATH);
            // Save the link by calling IPersistFile::Save.
            hres = ppf->Save(wsz, TRUE);
            ppf->Release( );
        }
        ps1->Release( );
    }
    return hres;
}
void CClient1::ProcessDownloadedFile(IDFile *idf) {
    //AfXMessageBox("File " + idf->fname + " downloaded as " + idf->tempname);
    CString dirpath = m_options->IDF_DIRECTORY +"\\" + idf->fname;
    CreateDirectory(dirpath, NULL);
    ZipFile zip(idf->tempname);
    zip.ExtractFiles(dirpath);
    //system("unzip -o \"" + idf->tempname + "\" -d \"" + dirpath + "\"");
```

-continued

```
        CString rootpath = dirpath + "\\root.htm";
        if (!FileExists(rootpath)) return;
        CString iconpath = dirpath + "\\rooticon.ico";
        if (!FileExists(iconpath)) iconpath = " ";
        LPITEMIDLIST idlist;
        char desktop[MAX_PATH];
        HRESULT res;
        res = SHGetSpecialFolderLocation(NULL, CSIDL_DESKTOPDIRECTORY, &idlist);
        if (res != NOERROR) return;
        if (!SHGetPathFromIDList(idlist, desktop)) return;
        CString linkpath = desktop;
        linkpath += "\\" + idf->fname + ".lnk";
        CreateLink(rootpath, linkpath, idf->fname, iconpath);
        return;
}
//
// C++ header file
// (c) 1996 ACS
//
#ifndef _SOCKETCONTROL_H_
#define _SOCKETCONTROL_H_
#include "stdafx.h"
#include "callback.h"
#include "lstnsock.h"
#include "atpsock.h"
const ATP_PORT = 608;
class SocketControl : public ISockCallback, IAtpCallback {
public:
        SocketControl( );
        virtual ~SocketControl( );
        virtual void ProcessPendingAccept(CAsyncSocket *sock);
        virtual void ProcessClose(CAsyncSocket *sock);
        BOOL Initialize(IDFServer *idfs);
private:
        IDFServer *m_idfs;
        CListeningSocket *m_lsock;
        CPtrArray m_sockets, m_todelete;
};
#endif // _SOCKETCONTROL_H_
        // End of headers
//
// C++ code file
// (c) 1996 ACS
//
#include "stdafx.h"
#include "SocketControl.h"
SocketControl::SocketControl( ) {
        m_lsock = NULL;
}
SocketControl::~SocketControl( ) {
        if (m_lsock) delete m_lsock;
        m_lsock = NULL;
}
BOOL SocketControl::Initialize(IDFServer *idfs) {
        m_idfs = idfs;
        m_lsock = new CListeningSocket(this);
        if (m_lsock->Create(ATP_PORT) && m_lsock->Listen( ) )
                return TRUE;
        return FALSE;
}
void SockControl::ProcessPendingAccept(CAsyncSocket *sock) {
        //for (int i = 0; i < m_todelete.GetSize( ); i++)
        //   delete m_todelete[i];
        //m_todelete.RemoveAll( );
        CAtpSocket *atp_sock = new CAtpSocket(this, this);
        if (sock->Accept(*atp_sock)) {
                atp_sock->Initialize(m_idfs);
                m_sockets.Add(atp_sock);
        }
        else
                delete atp_sock;
}
void SocketControl::ProcessClose(CAsyncSocket *sock) {
        int size = m_sockets.GetSize( );
        for (int i = 0; i < size; i++)
                if (m_sockets[i] == sock) {
                        m_sockets.RemoveAt(i);
                        m_todelete.Add(sock);
                }
```

-continued

```
    }
    // End of code
// lstnsock.h : interface of the CListeningSocket class
//
#ifndef ___LSTNSOCK_H___
#define ___LSTNSOCK_H___
class ISockCallback;
class CListeningSocket : public CSocket
{
        DECLARE_DYNAMIC(CListeningSocket);
private;
        CListeningSocket(const CListeningSocket& rSrc);    // no implementation
        void operator=(const CListeningSocket& rSrc);  // no implementation
// Construction
public:
        CListeningSocket(ISockCallback* pCB);
// Attributes
public:
        ISockCallback* m_pCB;
// Overridable callbacks
protected:
        virtual void OnAccept(int nErrorCode);
// Implementation
public:
        virtual ~CListeningSocket( );
#ifdef _DEBUG
        virtual void AssertValid( ) const;
        virtual void Dump(CDumpContext& dc) const;
#endif
};
#endif // ___LSTNSOCK_H_
// lstnsock.cpp : implementation of the CListeningSocket class
#include "stdafx.h"
#include "lstnsock.h"
#include "callback.h"
CListeningSocket::CListeningSocket(ISockCallback* pCB)
{
    m_pCB = pCB;
}
//////////////////////////////////////////////////////////////////
// CListeningSocket Overridable callbacks
void CListeningSocket::OnAccept(int nErrorCode)
{
    CSocket::OnAccept(nErrorCode);
    if (!nErrorCode)
        m_pCB->ProcessPendingAccept(this);
    else
        m_pCB->ProcessAcceptError(this, nErrorCode);
}
//////////////////////////////////////////////////////////////////
// CSocket Implementation
CListeningSocket::~CListeningSocket( )
{
}
#ifdef _DEBUG
void CListeningSocket::AssertValid( ) const
{
    CSocket::AssertValid( );
}
void CListeningSocket::Dump(CDumpContext& dc) const
{
    CSocket::Dump(dc);
}
#endif //_DEBUG
IMPLEMENT_DYNAMIC(CListeningSocket, CSocket)
#include <stdio.h>
#include <iostream.h>
#include <winsock.h>
#include <string.h>
const long default_block = 16384;
const long inbuf_size = 1024;
long inbuf_len;
char inbuf[inbuf_size+1];
char *data_buf = NULL;
enum atp_errors {
      EATP_NOERROR = 0,
      EATP_TIMEOUT,
      EATP_BUFFEROVERFLOW,
      EATP_CANNOTCONNECT,
```

```
    EATP_UNEXPECTEDEXIT,
    EATP_BADFILE,
    EATP_FILENOTACCEPTED,
    EATP_PROTOCOL,
    EATP_LOGINFAILED,
    EATP_RECIPIENTUNKNOWN,
    EATP_MACHINEBUSY
};
SOCKET AtpSocket( );
int AtpConnect(SOCKET sock, char *addr);
int AtpLogin(SOCKET sock, char *login, char *passwd, char *recipient);
int AtpSendFile(SOCKET sock, char *fname, char *rname);
void AtpQuit(SOCKET sock);
int main(int argc, char *argv[ ]) {
    if (argc < 2) {
        cout << argv[0] << " <machine> <file> {<file> ... ]\n"}
        return 0;
    }
    WSADATA wsaData;
    if (WSAStartup(MAKEWORD(1, 1), &wsaData)) {
        cerr << "Cannot find usable winsock.dll.\n";
        return 1;
    }
    inbuf_len = 0;
    inbuf[0] = 0;
    SOCKET sock = AtpSocket( );
    if (sock == INVALID_SOCKET) {
        cerr << "Cannot open a socket.\n";
        return 1;
    }
    int ret = AtpConnect(sock, argv[1]);
    if (ret) {
        cerr << "Cannot establish connection with " << argv[1] << "\n";
        return 1;
    }
    if (ret = AtpLogin(sock, "ttonchev", " ", "kobata")) {
        cerr << "Cannot login onto remote machine (" << ret << ").\n";
        return 1;
    }
    for (int i = 2; i < argc; i++)
        if (ret = AtpSendFile(sock, argv[i], argv[i])) {
            switch (ret) {
            case EATP_BADFILE:
        cerr << "Error: Cannot open file " << argv[i] << "\n";
        continue;
            case EATP_FILENOTACCEPTED:
        cerr << "Error: File " << argv[i] << " not accepted\n";
        continue;
            case EATP_UNEXPECTEDEXIT:
        cerr << "Error: Connection closed by foreign host.\n";
        return 1;
            default;
        cerr << "Error: Cannot send file " << argv[i] << "\n";
        continue;
            }
            break;
        }
        else
            cerr << "File " << argv[i] << " sent.\n";
    AtpQuit(sock);
    WSACleanup( );
    return 0;
}
SOCKET AtpSocket( ) {
    sockaddr_in sin;
    SOCKET sock = socket(PF_INET, SOCK_STREAM, 0);
    if (sock == INVALID_SOCKET) return sock;
    sin.sin_family = AF_INET;
    sin.sin_addr.s_addr = 0;
    sin.sin_port = 0;
    if (bind(sock, (sockaddr *)&sin, sizeof (sin))) {
        closesocket(sock);
        return INVALID_SOCKET;
    }
    return sock;
}
int AtpConnect(SOCKET sock, char *addr) {
    sockaddr_in sin;
    unsigned long ipaddr = inet_addr(addr);
```

-continued

```
        if (ipaddr == INADDR_NONE) {
            hostent *hinfo = gethostbyname(addr);
            if (!hinfo) return -1;
            ipaddr = *((long*)hinfo->h_addr_list[0]);
        }
        sin.sin_family = AF_INET;
        sin.sin_addr.s_addr = ipaddr;
        sin.sin_port = htons(608);
        return connect(sock, (sockaddr *)&sin, sizeof (sin));
}
int AtpWaitForLine(SOCKET sock, long timeout = 30) {
        timeval tout;
        tout.tv_sec = timeout;
        tout.tv_usec = 0;
        fd_set sockset;
        FD_ZERO(&sockset);
        FD_SET(sock, &sockset);
        while (!strstr(inbuf, "\r\n")) {
            if (inbuf_len == inbuf_size) return EATP_BUFFEROVERFLOW;
            if (!select(sock+1, &sockset, NULL, NULL, &tout))
                return EATP_TIMEOUT;
            int len = recv(sock, inbuf+inbuf_len, inbuf_size-inbuf_len, 0);
            if (len == SOCKET_ERROR) continue;
            if (len == 0) return EATP_UNEXPECTEDEXIT;
            inbuf_len += len;
            inbuf[inbuf_len] = 0;
        }
        return EATP_NOERROR;
}
int AtpGetReplyCode( ) {
        return (inbuf[0] - '0') * 100 + (inbuf[1] - '0') * 10 + inbuf[2] - '0';
}
int AtpGetCodeFamily(int code) {
        return (code / 100);
}
long AtpGetReplyArgument( ) {
        int code;
        long arg = -1;
        sscanf(inbuf, "%d (%ld)", &code, &arg);
        return arg;
}
void AtpClearLine( ) {
        char *lend;
        if (lend = strstr(inbuf, "\r\n")) {
            lend += 2;
            char buf[100];
            strncpy(buf, inbuf, lend-inbuf);
            buf[lend-inbuf] = 0;
            cerr << buf;
            for (int i = 0; i <= inbuf_len - (lend - inbuf); i++)
                inbuf[i] = lend[i];
            inbuf_len -= (lend - inbuf);
        }
}
int AtpReadCode(SOCKET sock, int *code, long *arg = NULL) {
        int ret = AtpWaitForLine(sock);
        if (ret) return ret;
        *code = AtpGetReplyCode( );
        if (arg)
            *arg = AtpGetReplyArgument( );
        AtpClearLine( );
        return EATP_NOERROR;
}
int AtpSendBuffer(SOCKET sock, char *buf, long len) {
        if (len < 100) cerr << buf;
        while (len < 0) {
            int sent = send(sock, buf, len, 0);
            if (sent == SOCKET_ERROR) return EATP_UNEXPECTEDEXIT;
            len -= sent;
            buf += sent;
        }
        return EATP_NOERROR;
}
int AtpLogin(SOCKET sock, char *login, char *passwd, char *recipient) {
        int ret, code;
        char buf[100];
        ret = AtpReadCode(sock, &code);
        if (ret) return ret;
        if (code != 220) return EATP_PROTOCOL;
```

-continued

```
    sprintf(buf, "FROM %s %s\r\n", login, passwd);
    ret = AtpSendBuffer(sock, buf, strlen(buf));
    if (ret) return ret;
    ret = AtpReadCode(sock, &code);
    if (ret) return ret;
    if (AtpGetCodeFamily(code) != 2) return EATP_LOGINFAILED;
    sprintf(buf, "USER %s\r\n", recipient);
    ret = AtpSendBuffer(sock, buf, strlen(buf));
    if (ret) return ret;
    ret = AtpReadCode(sock, &code);
    if (ret) return ret;
    if (AtpGetCodeFamily(code) != 2) return EATP_RECIPIENTUNKNOWN;
    return EATP_NOERROR;
}
int AtpSendFile(SOCKET sock, char *fname, char *rname) {
    const stdblksize = 16384;
    long fsize, fblksize, fblknum;
    int ret, code;
    long delay, arg;
    char buf[200];
    FILE *fin = fopen(fname, "rb");
    if (!fin) return EATP_BADFILE;
    if (fseek(fin, 0, SEEK_END))
        return EATP_BADFILE;
    fsize = ftell(fin);
    rewind(fin);
    // Identify the file
    sprintf(buf, "NAME %s\r\n", rname);
    ret = AtpSendBuffer(sock, buf, strlen(buf));
    if (ret) return ret;
    ret = AtpReadCode(sock, &code);
    if (ret) return ret;
    if (AtpGetCodeFamily(code) > 3) return EATP_FILENOTACCEPTED;
    sprintf(buf, "FILE %ld\r\n", fsize);
    ret = AtpSendBuffer(sock, buf, strlen(buf));
    if (ret) return ret;
    ret = AtpReadCode(sock, &code);
    if (ret) return ret;
    if (AtpGetCodeFamily(code) != 2) return EATP_FILENOTACCEPTED;
    // Negotiate block size
    fblksize = stdblksize;
    for (int i = 0; i < 3; i++) {
        sprintf(buf, "BLKSIZE %ld\r\n", fblksize);
        ret = AtpSendBuffer(sock, buf, strlen(buf));
        if (ret) return ret;
        ret = AtpReadCode(sock, &code, &arg);
        if (ret) return ret;
        //if (code == 222) break;
        if (code == 422 || code == 522)
            fblksize = arg;
        else
            break;
    }
    if (code != 222) return EATP_PROTOCOL;
    fblknum = (fsize-1) / fblksize + 1;
    // Transfer file
    while (1) {
        // Get a block request
        sprintf(buf, "READY\r\n");
        ret = AtpSendBuffer(sock, buf, strlen(buf));
        if (ret) return ret;
        ret = AtpReadCode(sock, &code, &arg);
        if (ret) return ret;
        if (code == 223) break;
        switch (code) {
        case 323:
            break;
        case 423:
            delay = arg;
            if (delay > 15) return EATP_MACHINEBUSY;
            Sleep(delay * 1000);
            continue;
        case 523:
            return EATP_MACHINEBUSY;
        default:
            return EATP_PROTOCOL;
        }
        long blk = arg;
        long size = (blk+1 < fblknum) ? fblksize : (fsize - fblksize*blk);
```

-continued

```
// Load block
if (data_buf) delete[ ] data_buf;
data_buf = new char[size];
if (fseek(fin, fblksize*blk, SEEK_SET))
    return EATP_BADFILE;
long len = fread(data_buf, 1, size, fin);
if (len != size)
    return EATP_BADFILE;
// Send block
sprintf(buf, "DATA %ld\r\n", size);
ret = AtpSendBuffer(sock, buf, strlen(buf));
if (ret) return ret;
ret = AtpReadCode(sock, &code, &arg);
if (ret) return ret;
    switch (code) {
    case 422:
        return EATP_PROTOCOL;
    case 423:
        delay = arg;
        if (delay > 15) return EATP_MACHINEBUSY;
        Sleep(delay * 1000);
        continue;
    case 523:
        return EATP_MACHINEBUSY;
    case 125:
        break;
    default:
        return EATP_PROTOCOL;
    }
    ret = AtpSendBuffer(sock, data_buf, size);
    if (ret) return ret;
    ret = AtpReadCode(sock, &code);
    if (ret) return ret;
    }
    return EATP_NOERROR;
}
void AtpQuit(SOCKET sock) {
    char *buf = "EXIT\r\n";
    AtpSendBuffer(sock, buf, strlen(buf));
    closesocket(sock);
}
```

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for transmitting data over a network from a server node to a client node, the method comprising the steps of:
    measuring an activity level at the client node to determine whether the activity level meets a busyness threshold;
    generating a hold signal if the activity level meets the busyness threshold;
    transmitting data to the client node over the network until the server node receives the hold signal; and
    suspending transmission of the data to the client node in response to the hold signal.

2. The method of claim 1 wherein the step of measuring the activity level includes measuring a busyness state of the network.

3. The system of claim 1 further comprising the step of reducing a rate of transmission of the data to the client node if the busyness state of the network is less than the busyness threshold.

4. The method of claim 1 wherein the step of measuring the activity level includes measuring a busyness state of the processor.

5. The method of claim 4 further comprising the step of measuring a second activity level representing a busyness state of the network to determine whether the second activity level meets a second busyness threshold, and wherein the step of generating the hold signal occurs if one of the activity levels meets the respective busyness threshold.

6. The method of claim 1 further comprising the steps of:
    generating a send signal if the activity level is below the busyness threshold, and
    resuming transmission of the data to the client node when the server node receives the send signal.

7. The method of claim 6 wherein the step of resuming transmission of the data begins with data previously unsent by the server node.

8. The method of claim 1 further comprising the steps of:
    transmitting an end-of-data-signal upon completing transmission of the data to the client node; and
    displaying an icon at the client node in response to the end-of-data signal.

9. The method of claim 1 wherein the step of measuring the activity level comprises the steps of measuring processor activity on the client node over a period of time and comparing said measured processor activity with the busyness threshold.

10. The method of claim 1 further comprising the steps of storing on said client node said data received by said client node and generating an icon on said display when said server node has successfully transmitted said data and said data is stored at said client node.

11. The method of claim 10 further comprising the steps of selecting said icon by a user and displaying said data in response to said selection.

12. A system for transmitting data over a network, said system comprising:
   a client node in communication with the network, the client node comprising:
      a detector measuring an activity level at the client node;
      a comparator determining whether the activity level meets a busyness threshold;
      a signal generator generating a hold signal if the comparator determines that the activity level meets the busyness threshold; and
      a transmitter transmitting the hold signal generated by the signal generator over the network; and
   a server node in communication with the network, the server node comprising:
      data representing content from a content provider; and
      a transmitter transmitting the data to the client node over the network unless the server node receives the hold signal,
   wherein the transmitter of the server node suspends transmission of the data to the client node in response to the hold signal.

13. The system of claim 12 wherein the activity level measured by the detector is a busyness state of the network.

14. The system of claim 12 wherein the client node comprises a processor and the activity level measured by the detector is a busyness state of the processor.

15. The system of claim 14 wherein the detector measures a second activity level representing a busyness state of the network and the comparator determines whether the second activity level meets a second busyness threshold, and wherein the signal generator generates the hold signal if one of the activity level meets the respective busyness threshold.

16. The system of claim 12 wherein the signal generator generates a send signal if the comparator determines that the activity level is below the busyness threshold, and wherein the transmitter of the server node resumes transmission of the data when the server node subsequently receives the send signal from the client node.

17. The system of claim 11 wherein said client node further comprises a processor and memory in electrical communication with said processor and a display in electrical communication with said processor, said memory storing data received by said client node from said server node and wherein said processor generates an icon on said display when said server node has completely transmitted said data and said data is stored in said memory.

18. The system of claim 17 wherein said client node further comprises a user input device capable of selecting said icon on said display and wherein said display displays said data in response to selection of said icon by a user.

* * * * *